Sept. 22, 1964          P. VLAHOS          3,149,969
SELF-MATTING COMPOSITE PHOTOGRAPHY
Filed Sept. 13, 1960
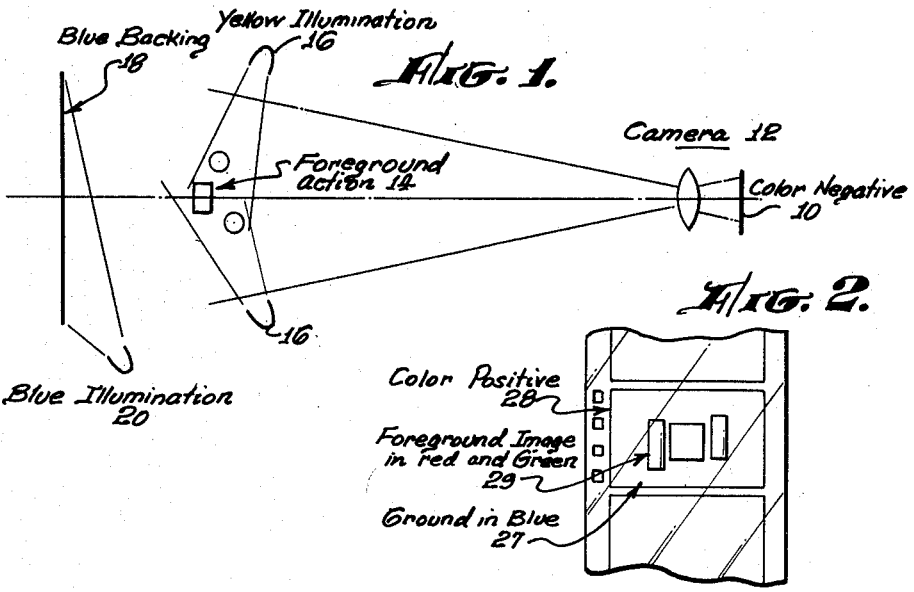
PETRO VLAHOS,
INVENTOR.
BY Barthelew & Lewis

United States Patent Office 3,149,969
Patented Sept. 22, 1964

3,149,969
SELF-MATTING COMPOSITE PHOTOGRAPHY
Petro Vlahos, Los Angeles, Calif., assignor to Motion Picture Research Council, Inc., Los Angeles, Calif., a corporation of California
Filed Sept. 13, 1960, Ser. No. 55,632
2 Claims. (Cl. 96—42)

The present invention relates to composite photography where separately exposed or prepared components are combined to form a final picture. The components may be of any nature or character, but, for simplicity of description here they will be considered as foreground and background components. As will become apparent, the method of the present invention is applicable equally well to the composition of still or of motions pictures where the foreground component usually involves action.

Many composite picture methods have been previously proposed, but nearly all of those have required the preparation and use of complementary mats through which the previously taken foreground and background films or other pictures have been printed onto a final negative or positive. Such matted operations always involve problems of accurate registration which are eliminated in the present method.

Typical of the few self-matting methods of the past are two Pomeroy Patents Nos. 1,673,019 and 1,788,740. In both of these previous methods a foreground or action illuminated by light of one color is photographed before a backing illuminated with a color complementary, or having a minus relation, to the foreground illumination; while the background is simultaneously printed onto the final negative by light from the backing through a dye positive of the background uniformly transparent to the color of foreground illumination.

The present method has distinctive advantages over all such previous methods. It eliminates the necessity of preparing any films additional to those of the foreground and background, as e.g. in Pomeroy 1,673,019; the necessity of having special optical apparatus, as e.g. in 1,788,740; and it also allows the background film to be made either before or after the foreground exposure. In both those previous self-matting methods the background film must be made before the foreground is photographed, and is printed onto the final film simultaneously with the photography of the foreground or action. That, of course, means that the action cannot be photographed until the background photograph is at hand. Further, if the balance in the final film, between background and action, is not as desired, the action must then be repeated until proper balance is reached. The present method overcomes all those disadvantages in an extremely simple procedure involving the use of only standard photographic apparatus. The background may be photographed at any time it is available; e.g. scenes of a desired season. Also, foreground action scenes may be made on schedules independent of the background photography. And the present method obtains, in black and white, good and well balanced color values.

Briefly described, the method of the present invention involves first the exposure of a suitable color film to a foreground or action (to one component) illuminated with a predetermined range of the visible spectrum; preferably, and as an illustration here, the range including green and red radiation. That exposure is made before a backing illuminated with a range bearing a minus relation to that of the foreground illumination; in the illustrative preferred case, a cobalt blue color which is quite deficient in green. The resultant transparent color positive, made either by reversal by or printing from the exposed color negative, shows the foreground or action as it appears on the set in colors very closely corresponding to the colors of the originals; that being particularly true of most action, where relatively little blue is present. The ground around the color foreground image in that color positive corresponding to the backing color, is then uniformly blue and relatively transparent only to blue light. The color image of the foreground or action is relatively transparent only to its colors and relatively opaque to blue.

That color positive is printed onto the final composite negative with light preferably of the same color range to which the original negative was foreground exposed; and the selected background is printed onto that final negative with light bearing a minus relation to the colors involved in the color positive image and to which that image is sufficiently opaque to mat out the background over the area of the foreground image. The two printings, as will be seen, may be in any sequence, or simultaneous.

Illustrative preferred procedures are set out in greater detail in the following description, with reference to the accompanying drawings, in which:

FIG. 1 is a schematic showing of the initial exposure of the color negative;
FIG. 2 is a diagrammatic showing of a color foreground positive;
FIGS. 3 and 4 are schematic showings of, respectively, the foreground and background printings, in simple form; and
FIG. 5 is a schematic showing simultaneity of the two printings.

Several different kinds of color negatives procurable at present on the market are suitable to the present method in that their positives are well transparent to the colors to which the negatives have been exposed and are sufficiently opaque to a relatively minus color. Without implying any limitation, the color film known as Hispeed Ektachrome B has been chosen as an emulsion that is suitable not only for the selective transparency and opacity of its positive but also for its reversibility to positive without the requisition of another film. Tests of the reversal positive of that film have shown high transparency to the colors of original negative exposure, and relatively high opacity to colors bearing a minus relation to the exposure colors. Thus, if this original negative is given foreground exposure in the wave length range of, say, from 560 to 700 millimicrons, and ground exposure to a range, say, from 420 to 480 millimicrons; its positive carries a color foreground image quite transparent to the first mentioned range and quite opaque to the second, and a ground quite transparent to the second range and quite opaque to the first. Measurements on that film show approximately the following opacity relations. In the foregoing or action image area exposed to yellow light, opacity to yellow light about 0.15 and opacity to blue light about 1.4. In the ground area exposed to blue light, opacity to blue about 0.3 and opacity to yellow about 1.4. Those relative opacities are well sufficient to prevent background printing in the foreground area and fogging of the background area during foreground printing. With special care as to the foreground and backing illuminations, opacity densities as high as 2.0 have been obtained.

Using that film and those light ranges as examples, FIG. 1 shows the color negative 10 being exposed in camera 12 to a foreground action 14 illuminated by 16 with light of general yellow color (including the green and red), in front of a backing 18 with blue illumination 20. The backing may be white and illuminated with blue light; but is preferably itself blue so as not to reflect any yellow light that may spill over from the foreground lighting, and then can be illuminated with either blue or white light. In the illustration being given here, the foreground illumination may be through the range from 560 to 700 mm. and the backing from 420 to 480 mm. As pointed out later, these illustrative figures are not to be taken as limitative of the invention. It is only necessary that the illumination ranges be mutually exclusive and result in a color positive image relatively transparent to one predetermined visible radiation range, and relatively opaque to another radiation range, and with a ground relatively transparent to the latter range but relatively opaque to the first. In the illustration here being given, the positive resulting from that exposed negative will show a foreground image 29 in the color range of the foreground illumination, transparent to the colors of the image and opaque to the color of the surrounding ground 27, that ground 27—here blue—being opaque to the image colors and transparent to blue.

The resulting color positive 28 (FIG. 2) is printed onto the final black-and-white negative 30 as shown in simple scheme in FIG. 3, using a printing light to which the foreground image is transparent and the surrounding ground sufficiently opaque. Here illustratively, that printing light 32 is of the same range as the original foreground illumination.

The selected background is printed from a background positive 34, through the color positive 28, onto the final negative 30, using a printing light to which the ground of the color positive is transparent and the foreground image opaque. Here, illustratively, as indicated in FIG. 4, that printing light 36 is of the same range as that of the original backing illumination and of the ground in the color positive. But it can be of any wave length to which, as it is in this specific illustration, the foreground image is relatively opaque and to which the ground is relatively transparent. The selected background is thus printed onto the final negative in the area or areas that have been exposed, in the original negative, to light from the backing; but not in areas corresponding to reflected illumination from the foreground. If the foreground objects are completely opaque, the background is printed only onto the areas surrounding the foreground image. If transparent or semi-transparent objects are parts of the foreground, the background will be printed more or less clearly onto the areas corresponding to those transparencies where the backing illumination has come through to the original negative. The emulsion of the final negative is necessarily responsive to both printing lights.

As mentioned before, the printings of FIGS. 3 and 4 may be consecutive in either order, or simultaneous. They may be performed in any standard printer, of either the contact or projection type. For example, assuming motion picture films, the two films 30 and 28 may be run through one printer in registration, and at the same time through another printer with background film 34 also in registration.

Or the three films may be run in registration through, for instance, a printer with two projection heads, as schematically shown in FIG. 5. In that figure, the final negative 30 is schematically shown as being run through the camera head C of a projection printer having two projection heads A and B. Those two heads simultaneously project, via the semi-reflective element 40, the background film 34 with, say, blue illumination, and the foreground color film 28 with, say, yellow illumination, onto final negative 30. As is well understood, the three films are run through such a printer in register. In the schematic of FIG. 5, projection head A casts an image of background film 34 onto the foreground action positive 28.

The colors and radiation ranges here given are illustrative only. As has been remarked, it is only necessary that the foreground color film be foreground exposed to some predetermined range of visible radiation, and the ground exposed to some other radiation range, or even a single wave length; and that the resultant color positive to be relatively transparent only in its foreground image to a range substantially the same as its original foreground exposure, and relatively opaque to a range or wavelength to which its ground is relatively transparent. Thus, the radiation band or wave length of the backing illumination may be any to which the original negative is responsive differently from its response to the visible illumination of the foreground. And the radiation band or wave length used for printing the selected background may be any to which the color positive ground is relatively transparent and the foreground image relatively opaque. And thus, for instance, it is possible within the scope of the invention, to utilize, say, ultra-violet, or violet merging into the ultra-violet, for the original backing illumination; and then use, for the background printing, a light range peaking at the maximum transparency of the color positive ground.

In general, it will be readily understood that the background picture 34 need not be a photograph, but can be any kind of printable picture. It will also be understood that the method is not limited to composition of only two components. A positive of "final" composite 30 may be used as a background for the compositing addition of a second foreground component; and so on for any number of components.

In practical use of the method here described, it is contemplated that the final negative 30 will be black-and-white, and that a black and white background positive 34 will be used. However, variations in those particulars may produce special results. Assume, for one example, that final negative 30 is a color negative. It will then carry a negative color image of yellow cast of the foreground, and a negative image of the selected background printed onto it in the color of the background printing light, say blue. Its final positive will then carry a yellowish color image of the foreground surrounded by a background in blue.

Or, if, as another instance, the background positive 34 is a color positive, the positive of the final negative 30, if black-and-white, will carry a black-and-white positive record of only that color component of the background corresponding to the backing illumination and the background printing light. Or, if, in that case, final negative 30 is also a color film, its positive will carry the yellowish color image of the foreground surrounded by a background showing only in its color or colors corresponding to its printing light. Various unusual, or weird, final composites may thus be produced.

It is obvious from the foregoing that the selected background may be photographed after, as well as before, the foreground photography. And it will also be understood that, given the foreground color film and the background picture, balance between those two components in the final composite is entirely controlled in the printing operations. And the relative positions of the foreground and background in the final composite may be adjusted in a projection printer to get the exact relations desired. Further, for instance, either component may be printed slightly out of focus to obtain special effects.

I claim:

1. The method of making a composite photograph comprising a foreground picture component on a different and separately recorded background picture component, said method including the following steps:

exposing a color recording light sensitive emulsion to the foreground component before a backing while illuminating said foreground component with visible radiation of a first predetermined range of wave lengths and the backing with a second wave length range lying outside of and bearing a minus relation to said first wave length range, said color recording emulsion being responsive to both said wave length ranges, preparing from the exposed color recording emulsion a corresponding positive color transparency carrying a positive color image of said foreground component corresponding in color to the said first wave length range, said positive color image being surrounded by a ground of substantially uniform color corresponding to said second wave length range, said positive color foreground image being relatively transparent to radiation of said first wave length range and relatively opaque to radiation of said second wave length range, and said surrounding ground being relatively opaque to radiation of said first wave length range and relatively transparent to radiation of said second wave length range, printing an image of said foreground component directly from said color positive transparency onto a light sensitive printing emulsion with printing radiation substantially of the first wave length range, providing a positive picture of the background component, printing an image of said background picture component onto said printing emulsion directly through said positive color transparency with printing radiation of a wave length range to which the ground of said positive color transparency is relatively transparent and its color foreground image is relatively opaque, said printing emulsion being responsive to both said printing radiations, the surrounding ground of the positive color transparency directly acting as a mat to prevent exposure of the portion of the printing emulsion that corresponds to the ground of the color transparency during the first mentioned printing, and the color foreground image of the color transparency directly acting as a mat to prevent exposure of the portion of the printing emulsion that corresponds to the color foreground image during the second mentioned printing, and, after both said printings, developing said printing emulsion.

2. The method defined in claim 1 and in which the first mentioned printing radiation and the illumination of the said foreground component are both limited to radiation in the range extending substantially from 560 to 700 millimicrons wave length, and the second mentioned printing radiation and the illumination of the backing are both limited to radiation in the range extending substantially from 420 to 480 millimicrons wave length.

References Cited in the file of this patent

UNITED STATES PATENTS

| | | |
|---|---|---|
| 1,776,269 | Pomeroy | Sept. 23, 1930 |
| 2,136,143 | Michaelis | Nov. 8, 1938 |
| 2,193,931 | Michaelis | Mar. 19, 1940 |
| 2,241,413 | Michaelis | May 13, 1941 |

FOREIGN PATENTS

| | | |
|---|---|---|
| 787,759 | Great Britain | Dec. 18, 1957 |